April 16, 1946.   C. G. TRANEFORS   2,398,567
CAMERA SHUTTER
Filed June 19, 1944

INVENTOR.
Carl G. Tranefors.
BY William C. Linton.
ATTORNEY.

Patented Apr. 16, 1946

2,398,567

UNITED STATES PATENT OFFICE 2,398,567

CAMERA SHUTTER

Carl Gustaf Tranefors, Goteborg, Sweden

Application June 19, 1944, Serial No. 541,056
In Sweden March 30, 1942

1 Claim. (Cl. 95—63)

The present invention relates to camera shutters of the kind which are provided with a number of swingably mounted shutter blades which can by means of a shutter-operating ring encircling the light opening of the camera and rotatably mounted on a portion likewise encircling the light opening be swung so as to open or close the light opening. More particularly the invention relates to camera shutters of the kind referred to, in which the shutter blades are pivotally mounted on pins carried by the shutter-operating ring and projecting into bearings provided in the blades, and in which a number of links are swingably mounted on the portion encircling the light opening and provided at a distance from their swinging axis with pins projecting into holes provided in the blades at a distance from the bearings for the pivot pins of the blades.

The invention has for its object to make it possible to use comparatively large and thin shutter blades in cameras for short exposures without danger that the blades on account of the great strains for which they are exposed at the rapid changes in their velocity are brought to deviate from their normal plane shape and clutch each other.

The invention is mainly characterized in that the bearings for the pins consist of nipples by means of which reinforcing plates are fixed to the shutter blades.

Figure 1:
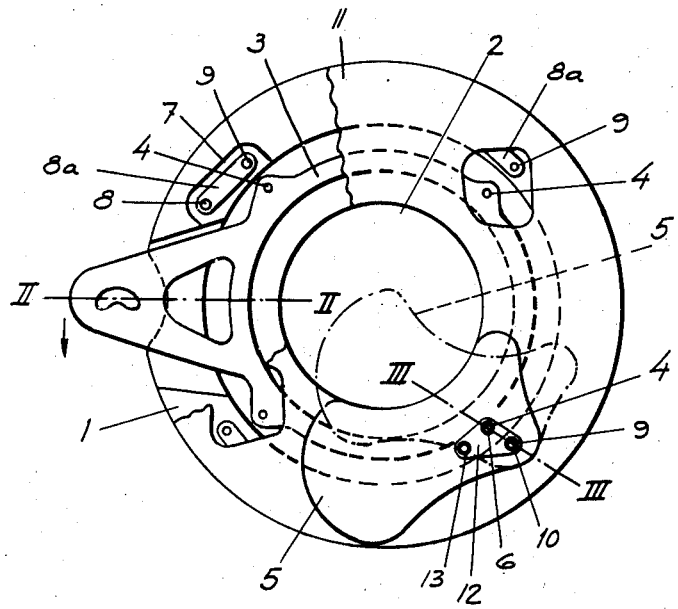
Figure 2:
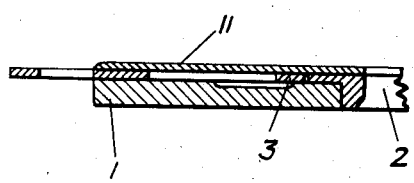
Figure 3:
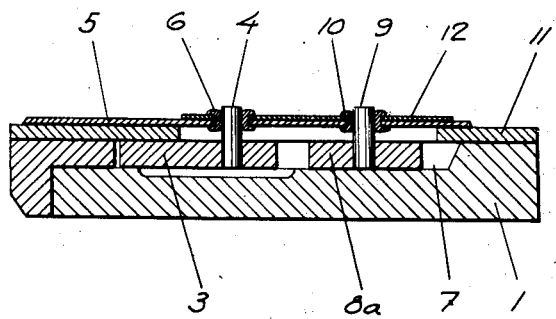

In the annexed drawing an embodiment of the invention is illustrated by way of example, whereby:

Figure 1 is a front view of a camera shutter with certain portions broken away, Figure 2 a radial section on a larger scale through the shutter along the line II—II in Figure 1, and Figure 3 a section along the line III—III in Figure 1 on a still larger scale.

In the drawing 1 denotes the ring-shaped front portion of the camera which encircles the light opening 2 and on which is rotatably mounted a ring 3, which by suitable means (not shown) can be turned in the one or the other direction. To the ring 3 there are fixed four pins 4 disposed at equal distance from each other and projecting parallel to the optic axis of the camera, and on each of said pins there is swingably mounted a shutter blade 5 (only one shown in the drawing). The shutter blades are provided with a tube-shaped nipple 6 which passes through the blade and is fastened to the same by flanging out the end portions of the nipple (see Figure 3), said nipples serving as bearings for the pins 4. In each one of four recesses 7 in the front portion 1 there is provided a link 8a which is swingably mounted on a pin 8 fastened to the front portion 1 and which link at a distance from the pin 8 carries a pin 9 projecting parallel to the optic axis of the camera. Said pin 9 is inserted in a tube-shaped nipple 10 which passes through the shutter blade 5 at a distance from the nipple 6 and is fastened to the blade by flanging out its end portions. The nipple 10 serves as a bearing for the pin 9. The front portion 1 with the ring 3 and the recesses 7 is covered by a ringshaped plate 11, which is provided with openings for the pins 4 and 9. The shutter blades 5 are provided with triangular shaped reinforcing plates 12 having openings formed adjacent each apex thereof which are fastened to the blades by means of the nipples 6 and 10 and, eventually, a further nipple 13 through openings in each blade 5 corresponding to said plate openings.

As the ring 3 finds itself in the position shown in Figure 1 the shutter blades occupy the open position shown with full lines. By turning the ring 3 in the direction of the arrow the shutter blades are by means of the swingable links 8a in a known manner swung to the position indicated by dotted lines, in which the light opening 2 be covered. As the ring 3 be turned back to its initial position the shutter blades are swung back to open position.

What I claim is:

An improvement in camera shutters of the type having a plurality of relatively thin shutter blades each swingably mounted on a pin carried by a rotatably mounted ring and a pin mounted on an end portion of a link pivotally connected to the shutter frame comprising a triangular shaped reinforcing plate mounted on each blade and having openings formed adjacent each apex of said plate, each of said shutter blades having openings formed therethrough corresponding to said plate openings, tubular members mounted through each of the corresponding openings in said blade and said plate and two of said tubular members each having one of said aforementioned pins positioned therethrough and the end portions of said tubular members forming flanges for retaining said plates to said blades.

CARL GUSTAF TRANEFORS.